United States Patent [19]
Ullmann et al.

[11] 3,731,045
[45] May 1, 1973

[54] CIRCUIT FOR AN ELECTRO-ERODING MACHINE FOR THE CONTROL OF THE RELATIVE MOVEMENT BETWEEN AT LEAST ONE ELECTRODE AND AT LEAST ONE WORKPIECE

[75] Inventors: Werner Ullmann, Locarno-Muralto; Laszlo Rabian, Locarno-Monti; Silvano Mattei, Locarno-Solduno; Arno Sieg, Locarno; Peter Suter, Locarno; Costantino Tadini, Locarno, all of Switzerland; Rudolf Panschow, Hannover, Germany; Volker Suhr, Neustadt a./Ruebenberge, Germany; Wolfgang Meyer, Hannover, Germany

[73] Assignee: Agie, A.G. fur industrielle Elektronik, Losone-Lorcarno, Switzerland

[22] Filed: July 1, 1971

[21] Appl. No.: 158,721

[52] U.S. Cl. ................................................219/69 V
[51] Int. Cl. ..........................................B23p 1/12
[58] Field of Search................219/69 C, 69 G, 69 P, 219/69 R, 69 S, 69 V

[56] References Cited

UNITED STATES PATENTS

| | | | |
|---|---|---|---|
| 2,974,216 | 3/1961 | Ihoue | 219/69 V |
| 3,591,761 | 7/1971 | Bederman et al. | 219/69 V |
| 3,610,864 | 10/1971 | Kholodnov | 219/69 V |

*Primary Examiner*—R. F. Staubly
*Attorney*—L. Gaylord Hulbert et al.

[57] ABSTRACT

This invention relates to a circuit for an electro-eroding machine for the control of the relative movement between at least one electrode and at least one workpiece by virtue of data stored on an information carrier which relative movement contains at least one length of curve defined by the data and which data are corrected in consideration of the thickness of the electrode, the width of the operating gap, the erosive condition in the operating gap and which are supplied to at least one advancing device for the electrode and/or the workpiece as control signals generated in a computing unit by means of an interpolation process.

13 Claims, 7 Drawing Figures

Patented May 1, 1973

INVENTORS
WERNER ULLMANN
LASZLO RABIAN
SILVANO MATTEI
ARNO SIEG
PETER SUTER
COSTANTINO TADINI
RUDOLF PANSCHOW
VOLKER SUHR
WOLFGANG MEYER

BY

ATTORNEYS

Patented May 1, 1973  3,731,045

INVENTORS
WERNER ULLMANN
LASZLO RABIAN
SILVANO MATTEI
ARNO SIEG
PETER SUTER
COSTANTINO TADINI
RUDOLF PANSCHOW
VOLKER SUHR
WOLFGANG MEYER

BY

ATTORNEYS

INVENTORS
WERNER ULLMANN
LASZLO RABIAN
SILVANO MATTEI
ARNO SIEG
PETER SUTER
COSTANTINO TADINI
RUDOLF PANSCHOW
VOLKER SUHR
WOLFGANG MEYER

BY

ATTORNEYS

CIRCUIT FOR AN ELECTRO-ERODING MACHINE FOR THE CONTROL OF THE RELATIVE MOVEMENT BETWEEN AT LEAST ONE ELECTRODE AND AT LEAST ONE WORKPIECE

In a known programme-controlled electro-eroding machine the relative movement between a shaped electrode or a wire electrode and a workpiece is controlled by an electrical circuit by virtue of the data which are stored in a punched tape so that the desired workpiece contour can be produced. Practice has revealed that complex components must be incorporated in the electronic circuit for complex curves in the workpiece contour. Complex curves are superpositions of simple curves. This resulted in great expenditure for the electronic control as compared to that for the electro-eroding machine, which is undesirable. In order to keep expenditure for the electronic control at a reasonable level one has limited oneself to simple curves of the workpiece contour between the electrode and the workpiece. Simple curves are straight lines, circles, ellipses, parabolas and the like which must be painfully combined into a workpiece contour, only an approximation of the simple curves to the real workpiece contour being in many cases obtained. The desired reduction of expenditure for the electronic control was secured by dispensing with the possibilities of application which can be readily achieved by the electro-eroding machine proper. There is thus a bottleneck in the electronic control.

In order to provide a reasonable proportion between the expenditure for the electronic control and the expenditure for the electro-eroding machine while all imaginable curves of the workpiece contour are eroded, control system have been evolved which are disclosed in the Swiss Pat. applications Nos. 9594/70, BE 13 886 and 10123/70, BE 13 887 of the same applicants. These control systems are characterized by their simple basic conception on the construction block principle and are designed for special problems of electric erosion, particular weight being attached to the simplicity of programming the curve.

The present invention relates to a component which can be incorporated in such control systems. The component according to this invention may be used in the control of a shaped electrode and/or a wire electrode.

The invention is characterized by an indexing unit comprising:
a memory to receive the data for the angle of rotation $\alpha$, by which angle the system of co-ordinates of the curve portion is to be rotated, the said data being stored in the information carrier;
a computing circuit to receive the corrected data of the curve length and the data of the angle of rotation $\alpha$ supplied by the memory, which computing circuit calculates, in a multiplication circuit and an addition and subtraction circuit, the new data of the curve portion rotated by the said angle $\alpha$ and supplies them as signals to a circuit arranged downstream thereof, and
the control circuit designed as a memory or computing unit.

Embodiments of the invention are explained in greater detail with reference to the drawings in which FIG. 1 is an advancing device in perspective view to illustrate the mode of operation of the invention;

Figure 1:
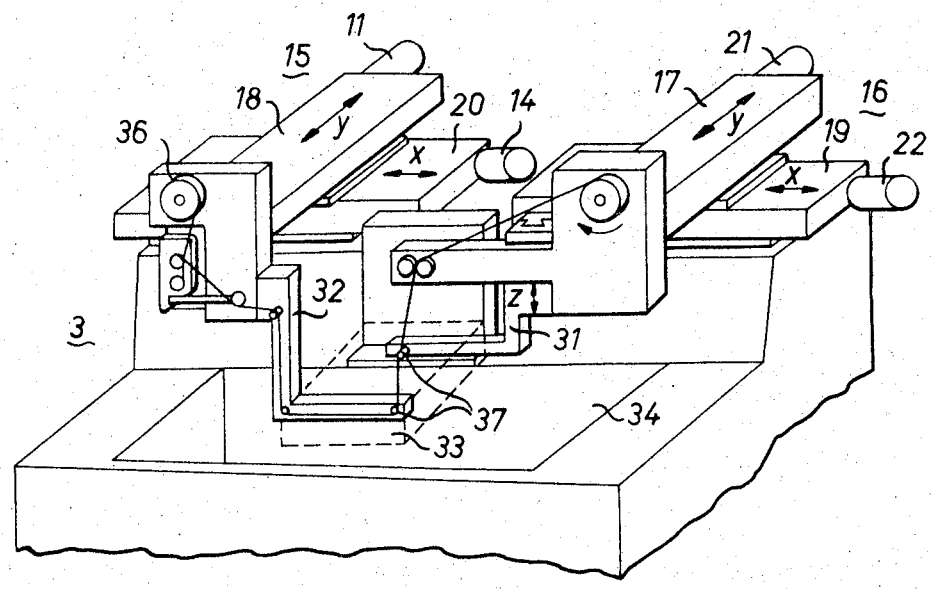

The advancing device of FIG. 1 is only an example of various embodiments. With this advancing device a wire electrode is employed for the electro-erosive "cutting" of the workpiece contour. With a somewhat differently designed advancing device, a shaped electrode for eroding recesses, such as engravings with particularly shaped recesses and curves, can be employed. The following explanations, which relate to a wire electrode, therefore apply to a shaped electrode in the same manner. The advancing device shown in FIG. 1, which is arranged in an eroding machine in the manner known, substantially consists of the two cross-tables 15, 16. Each cross-table can be displaced on the two co-ordinates $x$ and $y$. Each cross-table consists of the two mobile portions 17, 18, 19, 20. Attached to each mobile portion is a driving motor 11, 14, 21, 22. The driving motors are connected to the correspondingly designated outlets of the control circuit shown in FIG. 2. The holding device 3 for the wire electrode 36 consists of the two wire guides 31, 32. One wire guide 31 is attached to the mobile portion 17 of the cross-table 16 and the other wire guide 32 is attached to the mobile portion 18 of the cross-table 15. The wire electrode 36 consists of a copper wire of e.g. one to three millimeters diameter which is wound on a supply spool (not shown). In erosive operation the wire electrode is wound, from the supply spool, on another spool (not shown) so that the wire electrode is moved at a constant velocity via guide rollers merely indicated in FIG. 1. Located between the wire guides 31, 32 is the workpiece 33 which is only indicated for greater clarity. The workpiece 33 is attached to a firm support and placed in the container 34 which is located on the table of the eroding machine. Arranged in the said container 34 is the dielectric medium necessary for the performance of erosion. The wire electrode 36 is taut between the two pins 37 which are attached to the wire guides 31, 32. These pins may be replaced by other means for stretching the wire electrode, such as funnel-type means. In FIG. 1 the wire electrode is so tensioned between the pins 37 of the wire guides 31, 32 that it forms a right angle with the surface of the workpiece. If the two cross-tables 15, 16 are moved in parallel on the $x$ and $y$-co-ordinate, the wire electrode 36 maintains the angular position relative to the surface of the workpiece 33 shown in FIG. 1 and erodes contours or shapes from the workpiece 33. As will be explained in greater detail below, such figures or contours have been supplied to an information carrier and are converted into control signals, via the control circuit according to FIG. 2, for the driving motors 11, 14, 21, 22 of the two cross-tables 15, 16. This produces contours or shapes having a straight cut face. If one wire guide is displaced relatively to the other, the wire electrode 36 forms an angle $\beta$ with the surface of the workpiece 33. The angle $\beta$ is in that case smaller than 90°. This oblique position of the wire electrode relative to the surface of the workpiece enables conical contours or figures to be produced from the workpiece 33. The mobile portions 17, 19, 18, 20 of the two cross-tables 15, 16 move similarly in parallel when the conical contours are cut. This will later be discussed in greater detail with reference to FIG. 2. In FIG. 1 an arrow $z$ indicates that the wire guide 31 can be moved on the $z$-co-ordinate. This movement may be effected either manually or by a further driving motor (not shown). The displacement on the $z$-co-ordinate is necessary if the distance between the two wire guides 31, 32 must be adjusted to the thickness of the workpiece 33 being processed. As is well known, the wire guide 31 is above and the wire guide 32 is underneath the workpiece. The displacement of the wire guide 31 in the $z$-direction changes the angle $\beta$ in conical cutting.

Figure 2:
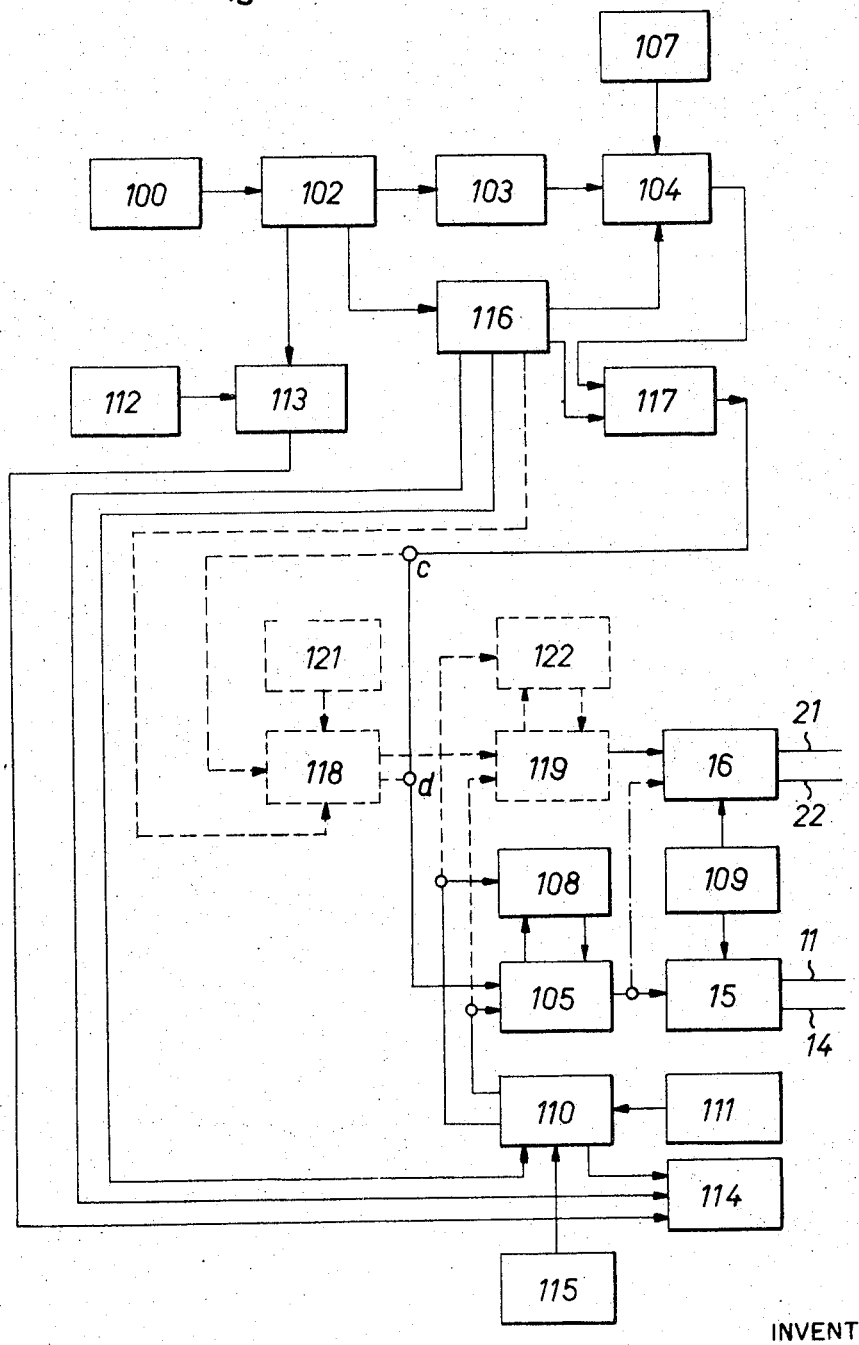
FIG. 2 is a box-type representation of the complete control circuit for the control of the relative movement between the workpiece and the electrode.

The circuit according to FIG. 2 controls the movements of the wire electrode 36 just described by virtue of data stored in an information carrier. The information carrier may be a punched tape, punched card or a magnetic tape. Recorded in the information carrier are the characteristic points of the path which the wire electrode 36 is called upon to travel in the workpiece 33. The characteristic points are the starting and end points of a curve length, which may be a straight line, a circle, an ellipsis, a parabola, an involute or a cycloid. The involute is formed, as is well known, by the superposition of the straight movement and a rotary movement. The cycloid is formed, as is well known, by the superposition of a circular movement and a rotary movement.

The characteristic data of the information carrier are given by the input 100 to the control circuit 2. This input may be a character-reader, punched-tape reader, punched-card reader, magnetic-tape device or picture scanner employing a Braun tube. This is determined by which information carrier could be most suitable for a certain assignment given to erosion. For the following description of the control circuit according to FIG. 2 it is assumed that the information carrier is a punched tape. The punched-tape reader 100 supplies the data to the buffer memory 102. A code converter 103 is arranged downstream of the buffer memory 102. The code converter 103 must convert the data of the punched tape. If some other information carrier is employed, the code converter 103 can be dispensed with. The converted data then pass into the correcting computing unit 104 which converts the characteristic points into corresponding characteristic points of the path of the axis of the wire electrode 36. In this process the width of the operating gap 111 is considered. The characteristic points of the workpiece contour supplied to the information carrier differ from the path curve on which the axis of the wire electrode 36 moves by one half of the diameter of the wire electrode and the width of the working gap 111. If a shaped electrode is employed for eroding or recesses, the thickness of the shaped electrode and the width of the operating gap must be considered. The thickness of the shaped electrode is understood to be its spatial dimensions relative to the center point of the electrode holder. The correcting computing unit 104 to this end receives, from the manual input 107, the values for the diameter of the wire electrode and for the width of the operating gap. If desired, the data relating to the wire diameter and, respectively, the thickness of the shaped electrode and the gap width may be stored on the information carrier as additional information so that the manual input 107 is not required. By means of the manual input 107 the additional information from the punched tape can naturally be corrected. The output signals supplied by the punched tape which define the path curve of the wire electrode 36 are supplied to the interpolator 105 and the indexing unit 117. The points $c$ and $d$ are interconnected as shown in FIG. 2. These points are separated if the wire electrode 36 is called upon to cut conically. The mode of operation of the indexing unit 117 will be described later so that only the general control will be described. The interpolator 105 converts, by virtue of the output signals representing the characteristic points, the complete path curve according to a predetermined programme. For this purpose, either the search-step process, which is also designated as an iteration interpolation, or the DDA - Digital Differential Analyzer- and, respectively, approximation process is employed. The control signals from the interpolator 105, which indicate the points of the path curve located between the characteristic points thereof, pass to the two cross-tables 15, 16 of which the driving motors 11, 14, 21, 22 displace the moving parts 17, 18, 19, 20 in the desired manner. The wire electrode 36 describes the path curve and cuts the curve portion from the workpiece 33 as per the data supplied by the punched-tape reader 100. It is here assumed that the wire electrode and the surface of the workpiece 33 enclose a right angle $\beta$. Conical cutting will be explained later.

Figure 7:
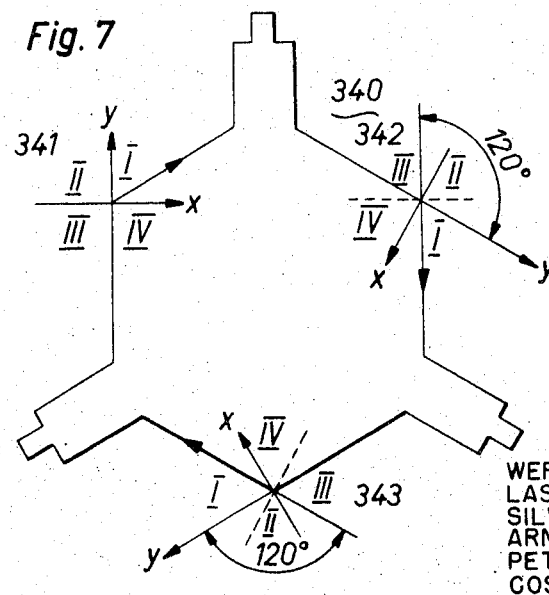
FIG. 7 shows a workpiece shape produced by the indexing unit incorporated in the control circuit according to FIG. 2.

The mode of operation of the part component 117 will now be described. Reference is here made to the workpiece contour of FIG. 7. The workpiece contour 340 of FIG. 7 is composed of several congruent curve lengths. The congruent curve lengths differ from one another only by their relative position. So far the data of the characteristic points of each congruent curve length have had to be stored in the information carrier. This complicated programming is eliminated by the indexing unit 117. The indexing unit 117 rotates the system of co-ordinates by the desired angle so that a congruent curve length, e.g. from point 341 to the point 342 of the workpiece contour 340 in FIG. 7, must be stored in the information carrier. The $x$, $y$ system of co-ordinates can be rotated as many times as desired. The indexing unit 117 for this purpose only requires the angle of rotation $\beta$ from the information carrier. Upon rotation of the system of co-ordinates the same data of the curve length previously eroded are used to erode the subsequent curve length from point 342 to point 343 in FIG. 7. When the wire electrode has reached the point 343, the system of co-ordinates is again rotated. The same characteristic data as used for the preceding congruent curve lengths are used for eroding the congruent curve length from the point 343 to the point 341.

Prior to disclosing the indexing unit 117 in greater detail, the individual components of the general circuit of FIG. 2 will now briefly be explained.

If the wire electrode 36 is to cut conically, a conicity computing unit 118 is provided in the circuit according to FIG. 2, the said unit calculating the characteristic points of the curve length in consideration of the conicity angle β, of the distance between the two pins 37 on the wire guides 31, 32 and the distance of a pin 37 from a surface of the workpiece 33. The conicity computing unit 118 is arranged between the part component 117 and the interpolator 105 for the cross-table 15 in the principal connecting line. The connection between the points c and d is suppressed in this case. The devices and connections required for conical cutting are shown in broken lines in FIG. 2. The conicity computing unit 118 supplies its output signals to the interpolator 105 for the cross-table 15 already described, and to the interpolator 119 which controls the driving motors 21, 22 of the cross-table 16. In this case, the dot-dash connecting line between the inlet of the cross-table 15 and the inlet of the cross-table 16 is eliminated. The data for the conicity computing unit 118, such as angle β, distance between the pins 37 of the two wire guides 31, 32, distance between pin 37 of the lower wire guide 32 and a theoretical point of intersection at the lower face of the workpiece 33, may be supplied by manual input 121 or by additional data supplied by the information carrier to the conicity computing unit 118. The manual input 121 may naturally complement and/or correct the additional data supplied by the information carrier. In conical cutting, the wire electrode describes, e.g. on the upper face of the workpiece 33, a path curve which is equidistantly spaced from the path curve on the lower face of the workpiece. The manual input 109 also enables the driving motors 11, 14, 21 22 of the cross-tables 15, 16 to be controlled which may be necessary in various cases. Each interpolator 105, 119 is equipped with a return memory 108, 122. These return memories are provided so that, in the event of trouble in the operating gap 111, the wire electrode 36 can return along the same curve length. Stored in the return memory in parallel with each associated interpolator are the characteristic data supplied by the correcting computing unit 104 (for straight cutting with the wire electrode 36) or by the conicity computing unit 118 (for conical cutting with the wire electrode). The monitoring device 110, if it detects trouble or a short-circuit in the operating gap 111, supplies a trouble signal to the interpolator 105 (in straight cutting) or to the two interpolators 105, 119 (in conical cutting) so that the control signals supplied to the driving motors 11, 14, 21, 22 of the two cross-tables 15, 16 are stopped. A further signal from the monitoring device 110 reaches the return memories 108, 122 so that they supply the stored characteristic data of the curve length just travelled by the wire electrode 36 to the interpolators. The latter interpolate the characteristic data in inverse order and supply the control signals to the driving motors of the two cross-tables. The wire electrode 36 returns by the curve length just travelled until the trouble in the x operating gap 111 has been eliminated. In the event that the trouble in the operating gap 111 is not yet remedied, the wire electrode will also return over the previous curve length. The return memories 108, 122 are so designed that they can store several curves. As soon as the trouble in the working gap 111 is remedied, the monitoring device 110 gives a "clear" signal to the interpolators and return memories. The wire electrode 36 is then advanced along the same curve lengths until it reaches the position in which the trouble or the short-circuit in the operating gap 111 has occurred. Subsequently, the normal eroding process for the cutting of the workpiece contour begins. With the manual input 115 data relating to the desired roughness of the cut faces of the workpiece contour, the cutting velocity of the wire electrode and the width of the operating gap can be supplied to the monitoring device 110.

For the purpose of controlling the processes in the circuit of FIG. 2 so far described, the computing clocking generator 113 is provided. For reasons of simplification, the lines of influence between the said generator 113 and the individual components are not shown. The clocking generator receives, from the punched tape reader 100 via the buffer memory 102, the data important for control, such as "positioning of wire electrode 36 at the beginning of cut in workpiece", "start of programme", "end of programme", "interruption" and data relating to the type of interpolation etc. These data may be complemented by the manual input 112. FIG. 2 shows a connecting line between the clocking generator 113 and box 114. Box 114 sympolically shows the erosion generator and a device for controlling the flushing conditions of the dielectric medium in the operating gap 111. Of the many lines of influence of the clocking generator 113 to the various components, only the control line to box 114 is shown. This is designed to indicate that the erosion generator and the device for the dielectric medium can be controlled by the punched tape via the reading device 100 and the bueffer memory.

A more detailed description will now be given of the control device 116 which is connected to a further outlet of the buffer memory 102. The control device 116 is supplied, by the buffer memory 102, with additional information which is stored in the punched tape. Such additional information may be:

a. data for the correcting computing unit 104 e.g. the diameter of the wire electrode 36, width of the operating gap 111;

b. data for the indexing unit 117, e.g. the angle α, by which the system of co-ordinates of a congruent curve length is to be rotated;

c. data for the conicity computing unit 118, e.g. conicity angle β, distance of the pins 37 of the two wire guides 31, 32 and distance of the pin 37 of the lower wire guide 32 from the theoretical point of intersection which, as is well known, is located on the lower face of the workpiece 33;

d. date for the monitoring device 110, e.g. roughness of the cut face eroded in the workpiece 33 by the wire electrode 36, cutting velocity of the wire electrode 36, width of the operating gap 111;

e. data for the control of the electrical parameters for the erosion generator 114, e.g. current, voltage, repetitive frequency, width, interval of impulses and/or double impulses and, respectively, ignition impulses, and f. data for the adjustment or modification of flushing conditions of the dielectric medium to the device 114.

Such additional information from the punched tape may be corrected, if necessary, by the manual inputs 107, 115, 121.

Figure 3:
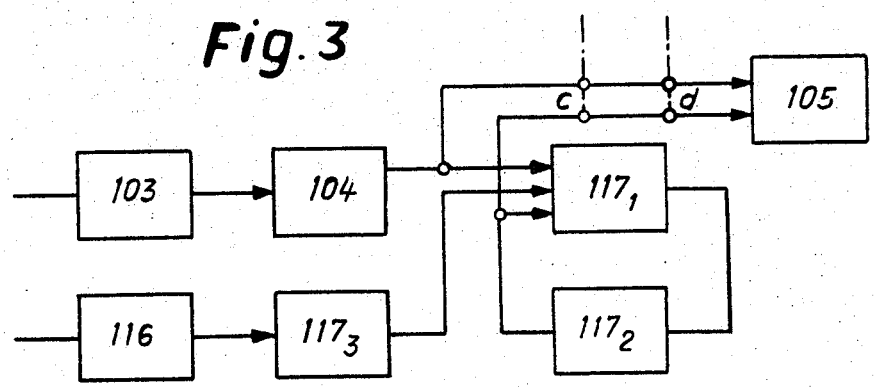
FIG. 3 is a box-type representation of an embodiment of the arrangement of the indexing unit in the control circuit according to FIG. 2.

The divisional component 117 will now be described with reference to FIGS. 3, 4, 5, 6 and 7. As previously stated, this component is designed to simplify the programming of congruent curve lengths. A cut shape consisting of several congruent curve lengths is shown in FIG. 7. Further examples of congruent curve lengths are found in gears. A tooth of a gear constitutes a congruent curve length. So far each individual congruent curve length has had to be individually programmed in the punched tape. With the aid of the electronic indexing unit 117 only a single congruent curve length need be programmed in the punched tape. To this end, only the angle $\alpha$ which, as previously stated, indicates the rotation of the system of co-ordinates need be supplied, by the punched tape reading device 100 via the buffer memory 102 and the switching device 116, to the electronic indexing unit 117. The angle $\alpha$ may be stored in the punched tape either as cos $\alpha$ and as sin $\alpha$ (FIGS. 3 and 4) or as $\alpha$ (FIG. 5) and so be supplied to the indexing units 117. The rotatory co-ordinate transformation which is effected is the indexing unit 117 in accordance with the equations $$\Delta x' = \Delta x \cos \alpha - \Delta y \sin \alpha$$

$$\Delta y' = \Delta x \sin \alpha + \Delta y \cos \alpha$$

will be described with reference to the example shown in FIG. 7 with the arrangement of the indexing unit of FIG. 3. It is assumed that no conical cut configurations are to be produced.

The components of FIG. 2 indicated in broken lines are inoperative and the points $c$ and $d$ (FIGS. 2 and 3) are interconnected. The congruent curve length of the workpiece contour 340 from point 341 to point 342 and the angle of rotation $\alpha$ are programmed in the punched tape. The characteristic data of the congruent curve length pass, via the punched tape reader 100, the buffer memory 102, the code converter 103 and the correcting computing unit 104, to the interpolator 105 and, in parallel therewith, to the computing circuit $117_1$. The computing circuit will later be described in detail with reference to FIG. 6. In the arrangement of the indexing unit as per FIG. 3, the angle of rotation $\alpha$ is stored in the punched tape as sin$\alpha$ and cos $\alpha$. These trigonometrical angular data pass, via a punched tape reader 100, the buffer memory 102 and the switching device 116, to a memory $117_3$ of the indexing unit 117. The memory $117_3$ passes these values on to the computing circuit $117_1$. The computing circuit comprises four inlet memories for the values $\Delta x$, $\Delta y$ (characteristic points of the congruent curve length), sin$\alpha$, cos $\alpha$ (angle of rotation $\alpha$). The interpolator 105 interpolates the characteristic data of the congruent curve length form the point 341 to the point 342 and supplies the appropriate control signals to the driving motors 11, 14, 21, 22 of the cross-tables 15, 16. It is here pointed out that, with a view to simplifying the description of the mode of operation of the indexing unit 117, it is assumed that the wire electrode 36 is not called upon to produce conical cut configurations. Accordingly, the conicity computing unit 118 indicated in broken lines in FIG. 2 is not connected at the points $c$ and $d$. If the conicity computing unit were to be used, the connection between the points c and d would be broken and the conicity computing unit 118 with its interpolator 119 and return memory 122 would be switched on so that the interpolator 119 could control the driving motors 21, 22 of the cross-table 16. We now revert to the assumption that the conicity computing unit 118 is not on and that the interpolator 105 supplies control signals to the driving motors of the two cross-tables 15, 16. While the interpolator 105 controls the driving motors 11, 14, 21, 22 of the cross-tables 15, 16 so that the wire electrode 36 can erode the congruent curve length from point 341 to point 342, the computing circuit $117_1$ calculates, in a multiplication circuit, addition circuit and substraction circuit, the increments of the subsequent curve length from point 342 to point 343 which has been rotated by the angle $\alpha$ of e.g. 120°. The computing circuit $117_1$ proceeds in accordance with the two equations previously given. In these equations, the values $\Delta x$, $\Delta y$ represent the characteristic data of the first congruent curve length from point 341 to point 342 and the values $\Delta x'$, $\Delta y'$ the values of the subsequent curve length, which has been rotated by the angle $\alpha$ of e.g. 120°, from the point 342 to the point 343. The values $\Delta x'$, $\Delta y'$ are supplied to the memory $117_2$. When the wire electrode 36 has reached the point 342, the interpolator 105 calls, from the memory $117_2$ according to FIG. 2, for the values for the curve length which the wire electrode is calles upon to travel from the point 342 to the point 343. At the same time these values are supplied to the second inlet of the computing circuit $117_1$ in which the congruent curve length is calculated which the wire electrode 36 is to travel from point 343 to point 341. The computing circuit stores the newly calculated values in the memory $117_2$ in the place of the old values already called for by the interpolator 105. The rotation of the system of co-ordinates and, respectively, a congruent curve length is so often calculated by the computing circuit $117_1$ as has been indicated when the first angle data were given. For the workpiece contour 340 of FIG. 7 two angular rotations of the system of co-ordinates $x$, $y$ and, respectively, the congruent curve length by 120° has been given in the first angle indication. In the production of a gear which obviously consists of substantially more numerous congruent curve lengths or teeth, the rotation of the congruent curve length, i.e. of the tooth and, respectively, the system of co-ordinates, must be effected much more frequently. If the conicity computing unit 118 (FIG. 2) is provided, conical gears, e.g. befel gears or conical cut configurations or tool contours can be cut from the workpiece 33 by means of the wire electrode 36. The arrangement of the electronic indexing unit 117 as per FIG. 3 consists substantially of a closed control circuit between the computing circuit $117_1$, the memory $117_2$ so that the angle $\alpha$ and the indication as to how many times the angle $\alpha$ is to be rotated must be rotated in the punched tape.

Figure 4:
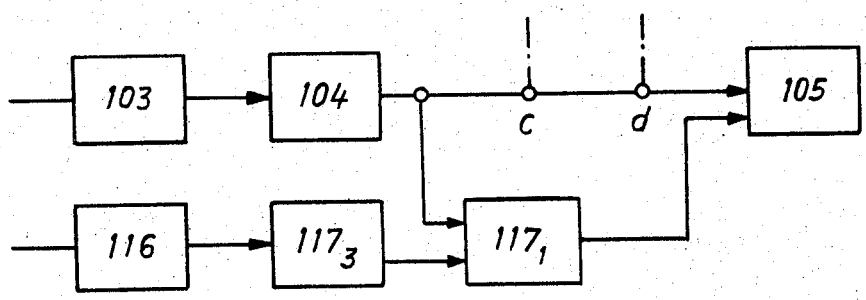
FIG. 4 is box-type view of a further embodiment of the arrangement of the indexing unit in the control circuit according to FIG. 2.
Figure 5:
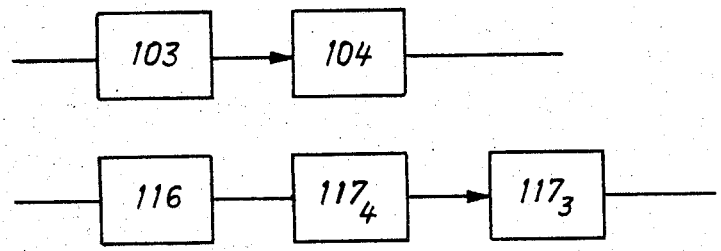
FIG. 5 is a box-type representation of another embodiment of the arrangement of the indexing unit in the control circuit according to FIG. 2.

In the arrangement of the indexing unit according to FIG. 4, each angular rotation must be individually stored in the punched tape. After each angle data, the characteristic data of the congruent curve length are supplied, by the punched tape, to the computing circuit $117_1$. To this end, a punched tape reader 100 may be employed which again reads the characteristic data of the previous congruent curve length in inverse order and supplies them to the computing circuit $117_1$. A second punched tape may also be employed which, via a second punched tape reader, periodically reads the characteristic data of the congruent curve length as soon as the first punched tape and, respectively, principal punched card has supplied the desired angular rotation to the computing circuit $117_1$. The second punched tape or auxiliary punched tape may be designed as an endless tape. The mode of operation of these two different punched tape programmes is similar. According to the arrangement shown in FIG. 4 the characteristic data are first supplied by the punched tape, via the punched tape reader 100, the buffer memory 102, the code converter 103 and the correcting computing unit 104, to the interpolator 105 and the computing circuit $117_1$. In this embodiment it is again assumed that the interpolator 105 supplies the driving motors 11, 14, 21, 22 of the cross-tables 15, 16 with control signals. The conicity computing unit 118, the interpolator 119, the return memory 122 and the manual input 121 shown in broken lines in FIG. 2 are not available so that the connecting line between the points c and d passes through as shown in FIGS. 2 and 4. While the interpolator 105 controls the wire electrode 36 for the erosion of the congruent curve length (points 341, 342 of FIG. 7), the values sin $\alpha$ and cos $\alpha$ are supplied by the punched tape, via the punched tape reader 100, the buffer memory 102, the switching device 116 and the memory $117_3$, to the computing circuit $117_1$. The computing circuit $117_1$ then accurately calculates, as described with reference to FIG. 3, from the characteristic data $\Delta x$ and $\Delta y$ of the first congruent curve length and from the values sin$\alpha$ and cos$\alpha$, the characteristic data $\Delta x'$ and $\Delta y'$ of the second congruent curve length (points 342 and 343 in FIG. 7). When the wire electrode 36 has reached the point 342 of the workpiece contour 340 in FIG. 7, the values $\Delta x'$ and $\Delta y'$ pass into the interpolator 105 so that the second congruent curve length can be cut by the wire electrode. During that time the punched tape supplies the values for the second angular rotation sin $2\alpha$ and cos $2\alpha$ as well as the characteristic data of the first congruent curve length to the computing circuit $117_1$. The repetition of the data of the first curve length is effected either by an inversely reading punched tape reader 100 or by a second punched tape reader with an auxiliary punched tape. In the latter case, the data for the second angular rotation are programmed in the principal punched tape. The characteristic data of the first congruent curve length pass, via the path previously mentioned (buffer memory 102, code converter 103, correcting computing unit 104), to the computing circuit $117_1$. The values for the second angular rotation pass, via the path previously described (buffer memory 102, switching device 116), to the computing circuit $117_1$. The computing circuit calculates, in the manner previously described, the characteristic data for the third curve length (points 343, 341 in FIG. 7). When the wire electrode 36 has reached the point 343, the new values for the third congruent curve length, which have in the meantime been stored in the computing circuit $117_1$, are supplied to the interpolator 105 which controls the wire electrode 36 for the erosion of the third congruent curve length. In order to keep down the programming expenditure for the values sin$\alpha$ and cos $\alpha$ in the punched tape, the angle $\alpha$ can be directly stored in the punched tape instead of these values. In that case, the punched tape must contain additional information as to how many times the angle must be rotated. In the arrangement of the indexing unit 117 as per FIG. 5 an interpolator $117_4$ is additionally provided between the switching device 116, which as is well known transmits the data relating to the angle of rotation of the congruent curve length and, respectively, the system of co-ordinates, to the memory $117_3$ of the indexing unit 117. This interpolator determines, from the angle indication $\alpha$ the trigonometrical values sin$\alpha$, cos $\alpha$ and supplies them to the memory $117_3$. The arrangement of the indexing unit 117 according to FIG. 5 works in a manner similar to that of the arrangements of FIGS. 3 and 4 and is therefore not described in greater detail. In order to simplify the arrangement of FIG. 5, the interpolator $117_4$ may readily be replaced by the interpolator 105 or 119. In that case it must only be ensured that the interpolator 105 or 119 which generates the control signals for the driving motors of the two cross-tables 15, 16 is used for the internal determination of sin$\alpha$, cos $\alpha$ during the time that it supplies no control signals to the driving motors of the two cross-tables. It is easily possible for the time spacing of the individual control signals coming from the interpolator 105 or 119 to suffice so that it can in the meantime be used for the angular rotation.

Figure 6:
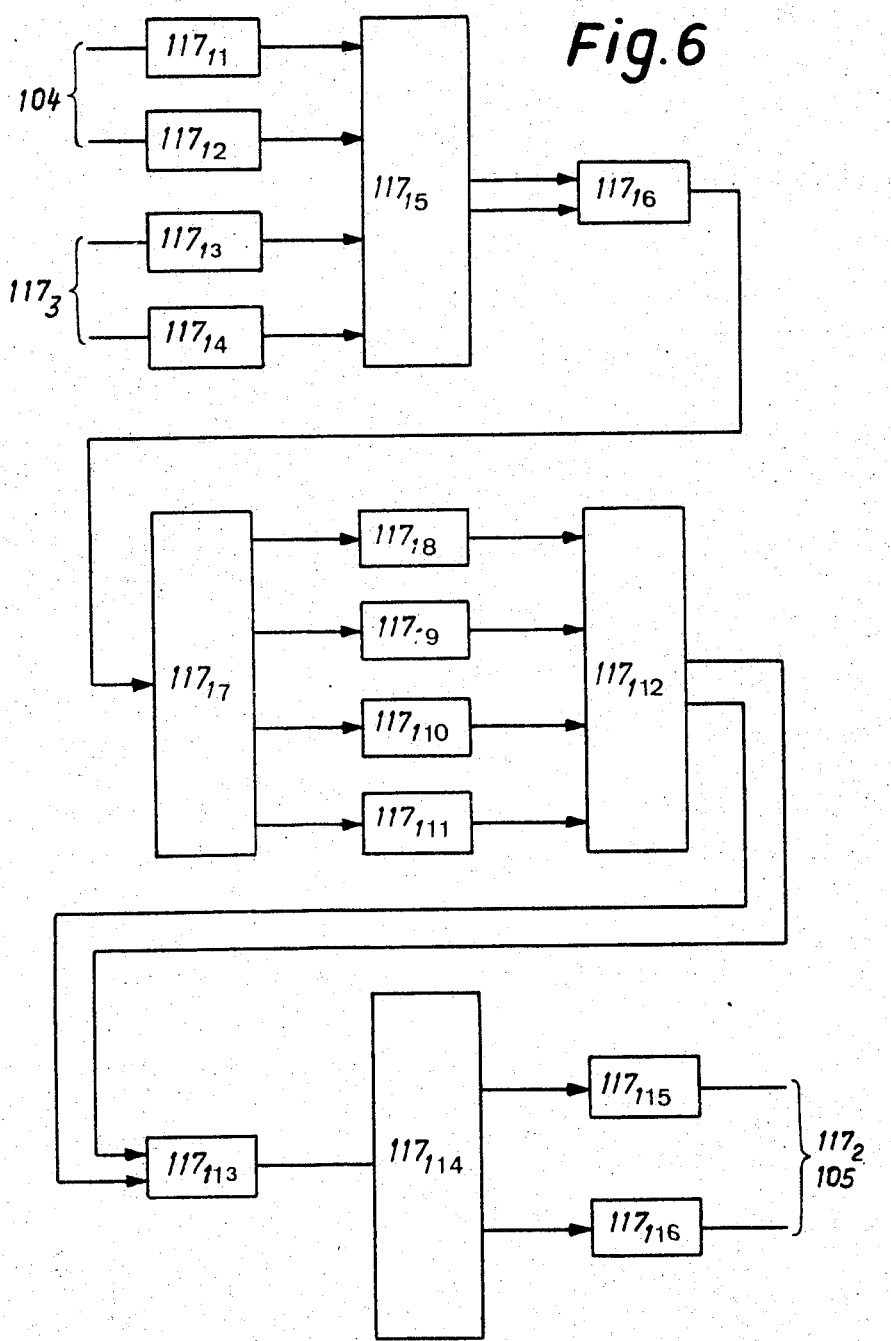
FIG. 6 is an embodiment of the computing circuit of the indexing unit.

The computing circuit $117_1$ of the indexing unit 117 as per FIG. 6 will now be described. As previously stated in the context of FIGS. 3 and 4, the values $\Delta x$, $\Delta y$, sin$\alpha\alpha$, cos$\alpha$ are supplied to the computing circuit $117_1$. In four memories $117_{11}$, $117_{12}$, $117_{13}$, $117_{14}$ these values are meanwhile stored. The computing sequence now described in more detail with reference to FIG. 6 is given by the two equations previously recited. Two of these values at a time are selected by the selective circuit $117_{15}$ and multiplied in the multiplication circuit $117_{16}$. The multiplied values $\Delta x$, sin$\alpha$, $\Delta x$, cos $\alpha$, $\Delta y$, sin$\alpha$, $\Delta y$, cos $\alpha$ are supplied to the distributor circuit $117_{17}$ and distributed to the intermediate memories $117_{18}$, $117_{19}$, $117_{110}$, $117_{111}$. These intermediate results are supplied, by a second selective circuit $117_{112}$, to a switchable addition subtraction circuit $117_{113}$ in such a manner that the final result is obtained. The second distributor circuit $117_{114}$ passes this final result to the two output memories $117_{115}$, $117_{116}$. From these two output memories the interpolator 105 or the conicity computing unit 118 (FIG. 2) enquires the characteristic data for the congruent curve length which is to be rotated by the angle $\alpha$. The computing circuit $117_1$ of FIG. 6 can naturally be simplified by utilizing the various components there described several times in their mode of operation. It is thus possible substantially to lower the expenditure for memories.

In conclusion it is pointed out that the indexing unit 117 is not limited to the advancing device 3 of FIG. 1 with two cross-tables 15, 16 but is employed also in an advancing device which has a cross-table and a rotary table for the relative movement of the wire electrode 36 and the workpiece 33 on carthesian co-ordinates and/or on polar co-ordinates.

What is claimed is:

1. A circuit for an electro-eroding machine for the control of the relative movement between at least one electrode and at least one workpiece by virtue of data stored in an information carrier, which relative movement comprises at least one curve length defined by the data, the said data being capable of being corrected in consideration of the thickness of the electrode, the width of the operating gap and the erosive condition in the operating gap and being supplied as control signals generated in a computing unit by means of an interpolation process to driving members of at least one advancing device for at least one of the electrode and the workpiece, characterized by an indexing unit comprising a memory for receiving data stored in the information carrier for an angle of rotation, by which angle a system of coordinates of the curve length is to be rotated, and a computing circuit for receiving corrected data of the curve length and the data for the angle of rotation from the memory, which computing circuit includes a multiplication circuit and an addition and subtraction circuit for calculating the new data of the curve length rotated by the said angle of rotation and supplying them to a switching circuit arranged downstream thereof, and a return memory for permitting return of the electrode and workpiece a certain length along the path curve in the event of undesirable electro-erosion at the operating gap.

2. A circuit according to claim 1 characterized by the fact that the indexing unit is arranged between a correcting computing unit for converting the characteristic data of the curve length from the information carrier in consideration of the diameter of the wire electrode and the width of the operating gap, and a computer which generates control signals for driving means of advancing devices for the electrode and the workpiece by means of an interpolation process.

3. A circuit according to claim 1 characterized by the fact that the indexing unit is arranged between a correcting computing unit for converting the characteristic data of the curve length supplied by the information carrier in consideration of the diameter of the wire electrode and the width of the operating gap, and a conicity computing unit which generates conicity data in consideration of the data relating to a conicity angle, to the distance between two wire guides arranged on a holding device for the wire electrode and to the distance of one wire guide from the theoretical point of intersection on the face of the workpiece.

4. A circuit according to claim 1 and further characterized by a switching unit which receives from the information carrier data for a correcting computing unit and possibly for a conicity computing unit, for a monitoring device, an erosion generator and for a device for the control of flushing conditions of dielectric medium, which switching unit is connected to the inlet of the said memory for the transmission of the data for the angle of rotation.

5. A circuit according to claim 1 characterized by the fact that the inlet of the said memory which receives the data of the angle of rotation is connected to the outlet of an interpolator, which interpolator is arranged downstream of a switching device which transmits data for a correcting computing unit, possibly for a conicity computing unit, for a monitoring device, for an erosion generator and for a device for the control of the flushing conditions of the dielectric medium.

6. A circuit according to claim 5 characterized by the fact that the computing circuit is provided with three inlets of which the first one is connected to the outlet of the correcting computing unit for receiving the corrected data of the curve length supplied by the information carrier, the second is connected to the outlet of the switching device or to the outlet of an interpolator for receiving the data of the angle of rotation supplied by the information carrier, and the third is connected to an intermediate memory for receiving the data of the curve length calculated by the computing circuit for effecting a further rotation of the same curve length by the same angle.

7. A circuit according to claim 6 characterized by the fact that the first and the third inlets of the computing circuit are connected to an inlet of one of the interpolator and the conicity computing unit.

8. A circuit according to claim 5 characterized by the fact that the computing circuit is provided with two inlets of which the first one is connected to the outlet of the correcting computing unit for receiving the corrected data of the curve length while the second is connected to one of the outlet of the switchang device and the outlet of an interpolator for receiving the data of the angle of rotation supplied by the information carrier.

9. A circuit according to claim 8 characterized by the fact that the outlet of the correcting computing unit which is connected to the first inlet of the computing circuit is connected to one of an inlet of the interpolator and the correcting computing unit, the outlet of the computing circuit being directly connected to the other inlet of the interpolator.

10. A circuit according to claim 1 characterized by the following components of the computing circuit, input memories for each value of the characteristic data of the curve length corrected by the correcting computing unit and for the data of the angle of rotation, a selective circuit for the selection of the data to be multiplied in the multiplication circuit, a distributing circuit which supplies the results coming from the multiplication circuit to intermediate memories, intermediate memories for the storage of the results supplied by the multiplication circuit, a further selective circuit for the selection of the intermediate results processed in the addition and subtraction circuit, and a further distributing circuit which supplies the final results from the adding and subtraction circuit to two output memories.

11. A circuit according to claim 1 characterized by the fact that a monitoring device is provided which, in the event of changes in the erosive conditions in the operating gap, influences the electrical parameters of the erosion generator, the interpolators and return memories associated with the interpolators.

12. A circuit according to claim 1 characterized by the fact that each interpolator contains a return memory which memories store the characteristic data of the curve length and which are so designed that they supply the stored data to the associated interpolator when a trouble signal comes from a monitoring device to generate a control signal in inverse order so that the wire electrode returns by the same curve length.

13. A circuit according to claim 1 characterized by the fact that each advancing means consists of a cross-table and that each cross-table comprises two moving members each displaceable on a coordinate, a wire guide being attached to a moving member of each cross-table.

* * * * *